United States Patent [19]

Harpell et al.

[11] Patent Number: 4,457,985

[45] Date of Patent: * Jul. 3, 1984

[54] BALLISTIC-RESISTANT ARTICLE

[75] Inventors: Gary A. Harpell, Morristown; Sheldon Kavesh, Whippony; Igor Palley, Madison; Dusan C. Prevorsek, Morristown, all of N.J.

[73] Assignee: Allied Corporation, Morris Township, Morris County, N.J.

[*] Notice: The portion of the term of this patent subsequent to Sep. 6, 1990 has been disclaimed.

[21] Appl. No.: 466,496

[22] Filed: Feb. 18, 1983

Related U.S. Application Data

[63] Continuation-in-part of Ser. No. 359,975, Mar. 19, 1982, Pat. No. 4,403,012.

[51] Int. Cl.$^3$ ................................................ D03D 3/00
[52] U.S. Cl. ........................................ 428/224; 428/229; 428/911
[58] Field of Search ....................... 428/224, 229, 911

[56] References Cited

U.S. PATENT DOCUMENTS 4,403,012 9/1983 Harpell et al. ........................ 428/290

OTHER PUBLICATIONS

R. C. Liable et al., "The Application of High-Modulus Fibers to Ballistic Protection," *J. Macromol. Sci.--Chem.*, A7(1), pp. 295-298, 312-314, 320-322, ('73).
R. C. Liable, "Ballistic Materials and Penetration Mechanics," *Methods and Phenomena: Their Applications in Sci. and Tech.*, 1980, vol. 5, pp. 72-115.
J. V. Hansen et al., "Flexible Body Armor Materials," 10th National State of the Art Symposium, Washington, D.C., Jun. 1974.
A. L. Alesi et al., "New Materials and Construction for Improved Helmets," Nov. 1975, pp. 1-11.

*Primary Examiner*—James J. Bell
*Attorney, Agent, or Firm*—Alan M. Doernberg; Gerhard H. Fuchs; Kenneth E. Stroup

[57] ABSTRACT

Articles such as vests, helmets and structural elements containing a network of ultrahigh molecular weight, high strength, high modulus polyethylene or polypropylene fibers. The fibers, and especially polyethylene fibers of 15, 20, 25, 30 or more g/denier tenacity, and 300, 500, 1,000, 1,500 or more g/denier tensile modulus impart exceptional ballistic resistance to the articles in spite of the melting points, e.g. 145°-151° C. for the polyethylene fibers and 168°-171° C. for the polypropylene fibers, which are high for these polymers, but substantially lower than the 200° C. or more melting point previously thought necessary for good ballistic resistance.

16 Claims, No Drawings

BALLISTIC-RESISTANT ARTICLE

This application is a continuation-in-part of application Ser. No. 359,975, filed Mar. 19, 1982 now U.S. Pat. No. 4,403,012.

DESCRIPTION

This application is related to seven commonly assigned, copending U.S. patent applications, each of which is incorporated herein by reference to the extent not inconsistent herewith:

Kavesh et al., "Producing High Tenacity, High Modulus Crystalline Thermoplastic Article Such As Fiber or Film," Ser. No. 359,019, filed Mar. 19, 1982, a continuation-in-part of Ser. No. 259,266, filed Apr. 30, 1981;

Kavesh et al., "High Tenacity, High Modulus Polyethylene and Polypropylene Fibers, And Gel Fiber Useful In The Production Thereof," Ser. No. 359,020, filed Mar. 19, 1982, a continuation-in-part of Ser. No. 259,266, filed Apr. 30, 1981;

Harpell et al., "Composite Containing Polyolefin Fiber and Polyolefin Polymer Matrix," Ser. No. 359,974, filed Mar. 19, 1982;

Harpell et al., "Coated Extended Chain Polyolefin Fiber," Ser. No. 359,976, filed Mar. 19, 1982;

Kavesh et al., "Fabrics and Twisted Yarns Formed from Ultrahigh Tenacity and Modulus Fibers and Methods of Heat-Setting," Ser. No. 429,942, filed Sept. 30, 1982;

Harpell et al., "Producing Modified High Performance Polyolefin Fiber," Ser. No. 430,577, filed Sept. 30, 1982; and Harpell et al., "Consolidating High Performance Polyolefin Fiber Network and Consolidated Product, Ser. No. 467,997, filed Feb. 18, 1983.

BACKGROUND OF THE INVENTION

Ballistic articles such as bulletproof vests, helmets, structural members of helicopters and other military equipment, vehicle panels, briefcases, raincoats and umbrellas containing high strength fibers are known. Fibers conventionally used include aramids such as poly(phenylenediamine terephthalamide), graphite fibers and the like. For many applications, such as vests or parts of vests, the fibers are used in a woven or knitted fabric. For many of the other applications, the fiber is encapsulated or embedded in a composite material.

A number of properties are generally considered to be necessary for the high strength fiber to be useful as a ballistic resistant material. Four of these factors listed by John V. E. Hansen and Roy C. Laible, in "Fiber Frontiers" ACS Conference, (June 10-12, 1974) entitled "Flexible Body Armor Materials" are higher modulus, higher melting point, higher strength and/or work-to-rupture values and higher resistance to cutting or shearing. With regard to melting point, it is indicated as desirable to retard, delay or inhibit the melting seen with nylon and polyester. In a book entitled "Ballistic Materials and Penetration Mechanics", by Roy C. Laible (1980), it is indicated that no successful treatment has been developed to bring the ballistic resistance of polypropylene up to the levels predicted from the yarn stress-strain properties (page 81) and that melting in the case of nylon and polyester fibers may limit their ballistic effectiveness. Laible indicated that NOMEX, a heat resistant polyamide fiber with modest strength, possesses fairly good ballistic resistant properties (page 88).

Furthermore, in "The Application of High Modulus Fibers to Ballistic Protection" R. C. Laible et al., J. Macromol. Sci.-Chem. A7(1), pp. 295-322 1973, it is indicated on p. 298 that a fourth requirement is that the textile material have a high degree of heat resistance; for example, a polyamide material with a melting point of 255° C. appears to possess better impact properties ballistically than does a polyolefin fiber with equivalent tensile properties but a lower melting point. In an NTIS publication, AD-A018 958 "New Materials in Construction for Improved Helmets", A. L. Alesi et al., a multilayer highly oriented polypropylene film material (without matrix) referred to as "XP" was evaluated against an aramid fiber (with a phenolic/polyvinyl butyral resin matrix). The aramid system was judged to have the most promising combination of superior performance and a minimum of problems for combat helmet development.

BRIEF DESCRIPTION OF THE INVENTION

It has been surprisingly found that extremely high tenacity polyethylene and polypropylene materials of ultra high molecular weight perform surprisingly well as ballistic-resistant materials, in spite of their relatively low melting points. Accordingly, the present invention includes a ballistic-resistant article of manufacture comprising a network of polyolefin fibers having, in the case of polyethylene fibers, a weight average molecular weight of at least about 500,000, a tensile modulus of at least about 300 grams/denier and a tenacity of at least about 15 grams/denier, and in the case of polypropylene fibers, a weight average molecular weight of at least about 750,000, a tensile modulus of at least about 160 grams/denier and a tenacity of at least about 8 grams/denier, said fibers being formed into a network of sufficient thickness to absorb the energy of a projectile. The invention includes such articles in which the network is either a woven or knitted fabric or a consolidated fiber network or is a composite or a laminated structure, although this application is directed primarily to structures which lack a matrix material.

DETAILED DESCRIPTION OF THE INVENTION

Ballistic articles of the present invention include a fiber network, which may be an ultra high molecular weight polyethylene fiber network or an ultra high molecular weight polypropylene network.

In the case of polyethylene, suitable fibers are those of molecular weight of at least about 500,000, preferably at least about one million and more preferably between about two million and about five million. The fibers may be grown in solution spinning processes such as described in U.S. Pat. No. 4,137,394 to Meihuzen et al., or U.S. Pat. No. 4,356,138 of Kavesh et al., issued Oct. 26, 1982, or a fiber spun from a solution to form a gel structure, as described in German Off. No. 3,004,699 and GB No. 2051667, and especially as described in application Ser. No. 259,266 of Kavesh et al. filed Apr. 30, 1981 and a continuation-in-part of Ser. No. 259,266 (Ser. No. 359,019), both copending and commonly assigned (see EPA 64,167, published Nov. 10, 1982). Examples of the gel spun fiber, and its use in preparing ballistic articles, are given in the Examples below. Depending upon the formation technique, the draw ratio and temperatures, and other conditions, a variety of properties can be imparted to these fibers. The tenacity of the fibers should be at least about 15 grams/denier, preferably at least about 20 grams/denier, more preferably at least 25 grams/denier and most preferably at least about 30 grams/denier. Similarly, the tensile modulus of the fibers is at least about 300 grams/denier, preferably at least about 500 grams/denier and more preferably at least about 1,000 grams/denier and most peferably at least about 1,500 grams/denier. These highest values for tensile modulus and tenacity are generally obtainable only by employing solution grown or gel fiber processes. Many of the fibers have melting points higher than the melting point of the polymer from which they were formed. Thus for example, ultra high molecular weight polyethylenes of 500,000, one million and two million generally have melting points in the bulk of about 138° C. As described further in Ser. No. 359,019, the highly oriented polyethylene fibers made of these materials have melting points 7°-13° C. higher, as indicated by the melting point of the fiber used in Examples 5A and 5B. Thus, a slight increase in melting point reflects the crystalline perfection of the present fibers. Nevertheless, the melting points of these fibers remain substantially below nylon; and the efficacy of these fibers for ballistic resistant articles is contrary to the various teachings cited above which indicate temperature resistance as a critical factor in selecting ballistic materials.

Similarly, highly oriented polypropylene fibers of molecular weight at least about 750,000, preferably at least about one million and more preferably at least about two million may be used. Such ultra high molecular weight polypropylene may be formed into reasonably well oriented fibers by the techniques prescribed in the various references referred to above, and especially by the technique of U.S. Ser. No. 259,266, filed Apr. 30, 1981, and the continuations-in-part thereof, both of Kavesh et al. and commonly assigned. Since polypropylene is a much less crystalline material than polyethylene and contains pendant methyl groups, tenacity values achievable with polypropylene are generally substantially lower than the corresponding values for polyethylene. Accordingly, a suitable tensile strength is at least about 8 grams/denier, with a preferred tenacity being at least about 11 grams/denier. The tensile modulus for polypropylene is at least about 160 grams/denier, preferably at least about 200 grams/denier. The melting point of the polypropylene is generally raised several degrees by the orientation process, such that the polypropylene fiber preferably has a main melting point of at least about 168° C., more preferably at least about 170° C.

In ballistic articles containing fibers alone, the fibers may be formed as a felt, knitted, basket woven, or formed into a fabric in any of a variety of conventional techniques. Moreover, within these techniques, it is preferred to use those variations commonly employed in the preparation of aramid fabrics for ballistic-resistant articles. Such techniques include those described in U.S. Pat. No. 4,181,768 and in M. R. Silyquist et al., J. Macromol. Sci.-Chem., A7(1) 203 et seq (1973).

The fabrics, once formed, may be heat set (under substantially constant dimensions in some cases) or heat shrunk as described in more detail in Ser. No. 359,976. Similarly, multifilament yarns from which the fabrics are made are preferably twisted and, optionally, heat-set. The weave used can be plain (tabby) or a basket weave. A satin weave is preferably used only if the fabric is to be consolidated, as described below. The yarns may be of any denier (e.g. 100–1500 denier, preferably 300–1000 denier) and the individual filaments may be of various deniers (e.g. 0.5–20 denier, preferably 5–10 denier). Various types of sizings may be used to facilitate fiber handling, and especially to minimize friction and fiber breakage. In many cases the sizing is removed after weaving.

The fibers may also be formed into "non-woven" fabrics by conventional techniques.

In addition to heat-setting and heat-shrinking, the fibers or fabrics may be subjected to heat and pressure. With low pressures and times, heat and pressure may be used simply to cause adjacent fibers (either in woven or non-woven networks) to stick together. Greater amounts will cause the fibers to deform and be compressed into a shape (generally film-like) in which voids are substantially eliminated (see Examples 27 and 28 below, Ser. No. 467,997). Further heat, pressure and time may be sufficient to cause the film to become translucent or even transparent, although this latter feature is not necessary for most ballistics-resistant articles. It is highly preferred that the edges of the fiber network or fabric be held taut during the molding process. Temperatures for molding may range from 100° to 160° C. (preferably 120°–155° C., more preferably 130°–145° C.) even though the polyethylene polymer may have a melting temperature of 138° C. and the fiber a main melting temperature (by DSC at 10° C./min.) of 147°–150° C. As shown in Table 13, below, good ballistics resistance is found for articles molded at 155° C.

In addition to the use of fabrics of fiber alone, it is contemplated to use fabrics of coated fibers. The present fibers may be coated with a variety of polymeric and non-polymeric materials, but are preferably coated, if at all, with a polyethylene, polypropylene, or a copolymer containing ethylene and/or propylene having at least about 10 volume percent ethylene crystallinity or at least about 10 volume percent propylene crystallinity. The determination of whether or not copolymers have this crystallinity can be readily determined by one skilled in the art either by routine experimentation or from the literature such as Encyclopedia of Polymer Science, vol. 6, page 355 (1967). Coated fibers may be arranged in the same fashion was uncoated fibers into woven, non-woven or knitted fabrics. In addition, coated fabrics may be arranged in pallel arrays and/or incorporated into laminants or composites. Furthermore, the fibers used either alone or with coatings may be monofilaments or multifilaments wound or connected in a conventional fashion.

The proportion of coating in the coated fibers may vary from relatively small amounts (e.g. 1% by weight of fibers) or relatively large amounts (e.g. 150% by weight of fibers), depending upon whether the coating material has any ballistic-resistant properties of its own (which is generally not the case) and upon the rigidity, shape, heat resistance, wear resistance and other properties desired for the ballistic-resistant article. In general, ballistic-resistant articles of the present invention containing coated fibers generally have a relatively minor proportion of coating (e.g. 1–25%, by weight of fibers), since the ballistic-resistant properties are almost entirely attributable to the fiber. Nevertheless, coated fibers with higher coating contents may be employed. More details concerning coated fibers are contained in copending, commonly assigned application Ser. No. 359,976 of Harpell et al., the disclosure of which is hereby incorporated by reference to the extent not inconsistent herewith.

In addition to fibers and coated fibers, simple composite materials may be used in preparing the ballistic-resistant articles of the present invention. By simple composite is intended to mean combinations of the ultra high molecular weight fiber with a single major matrix material, whether or not there are other materials such as fillers, lubricants or the like. Suitable matrix materials include polyethylene, polypropylene, ethylene copolymers, propylene copolymers and other olefin polymers and copolymers, particularly those having ethylene or propylene crystallinity. Suitable matrix materials also include, however, other materials which, in general, have a poor direct adherence to the polyethylene or polypropylene fibers. Examples of such other matrix materials include unsaturated polyesters, epoxy resins and polyurethane resins and other resins curable below the melting point of the fiber. As in the case of coated fibers, the proportions of matrix to fiber is not critical for the simple composites, with matrix amounts of about 5 to about 150%, by weight of fibers, representing a broad general range. Also within this range, it is preferred to use composites having a relatively high fiber content, such as fibers having only about 10–50% matrix, by weight of fibers. One suitable technique of forming such high fiber composites is to coat the fibers with a matrix material and then to press together a plurality of such coated fibers until the coating materials fuse into a matrix, which may be continuous or discontinuous.

The simple composite materials may be arranged in a variety of forms. It is convenient to characterize the geometries of such composites by the geometries of the fibers and then to indicate that the matrix material may occupy part or all of the void space left by the network of fibers. One such suitable arrangement is layers or laminates of fibers arranged in parallel fashion within each layer, with successive layers rotated with respect to the previous layer. An example of such laminate structures are composites with the second, third, fourth and fifth layers rotated plus 45°, −45°, 90° and 0°, with respect to the first layer, but not necessarily in that order. Other examples include composites with alternating layers rotated 90° with respect to each other. Furthermore, simple composites with short fiber lengths essentially randomly arranged within the matrix may be used.

Also suitable are complex composites containing coated fibers in a matrix, with preferred complex composites having the above-described coated fibers in a thermoplastic, elastomers or thermoset matrix; with thermoset matrixes such as epoxies, unsaturated polyesters and urethanes being preferred.

EXAMPLES

Preparation of Gel Fiber

A high molecular weight linear polyethylene (intrinsic viscosity of 18 in decalin at 135° C.) was dissolved in paraffin oil at 220° C. to produce a 6 wt. % solution. This solution was extruded through a sixteen-hole die (hole diameter 1 mm) at the rate of 3.2 m/minute. The oil was extracted from the fiber with trichlorotrifluoroethane (trademark Genetron ® 113) and then the fiber was subsequently dried. One or more of the multifilament yarns were stretched simultaneously to the desired stretch ratio in a 100 cm tube at 145° C. Details of sample stretching are given in Table 1, along with selected fiber properties.

In addition, Fiber E had a main melting peak at 144° C. by DSC at a scanning rate of 10° C./minute.

TABLE 1

| Fiber | Example | Stretch Ratio | Denier | Tenacity g/den | Modulus g/den | U.E. % |
|---|---|---|---|---|---|---|
| A | 1 | 12 | 1156 | 11.9 | 400 | 5.4 |
| B* | 1,2 | 18 | 1125 | 9.4 | 400 | 4.0 |
| C | 3,4 | 13 | 976 | 15.0 | 521 | 5.8 |
| D | 5 | 17 | 673 | 21.8 | 877 | 4.0 |
| E | 6 | 15 | 456 | 21.6 | 936 | 3.9 |
| F | 7 | 18 | 136 | 27.6 | 1143 | 4.1 |

*Fiber B apparently retained some oil after extraction, thus accounting for its inferior properties compared to Fiber F.

EXAMPLES 1–6

High density polyethylene film (PAXON ® 4100 high density polyethylene, an ethylene-hexene-1 copolymer having a high load melt index of 10 made and sold by Allied Corporation) was placed on both sides of a three inch by three inch (6.75 cm × 6.75 cm) steel plate and then layers of parallel multistrand yarn of high tenacity polyethylene yarn (as described below) were wound around the plate and film until the film on both sides was covered with parallel fibers. Film was then again placed on both sides and the yarn was wound in a direction perpendicular to the first layer. The process was repeated with alternating film and fiber layers, and with adjacent fiber layers being perpendicular to each other until the supply of fibers was exhausted or a fiber content of 7 g for each side has achieved. The wound plate was then molded under pressure for 30 minutes at 130°–140° C. The sample was then removed and slit around the edges to produce an A and B sample of identical fiber type and areal density.

The above procedure was followed six times with the fibers indicated in Table 2. For Example 1, 37.4 weight % of the fibers used were as indicated by the line 1—1 and 62.6 weight % of the fibers were as indicated by the line 1-2.

TABLE 2

| Example | Fiber Tenacity (g/denier) | Fiber Modulus (g/denier) | UE* | Fiber Wt | Wt % Fiber |
|---|---|---|---|---|---|
| 1-1 | 16.3 | 671 | 4.6% | 7.425 g | 75.2 |
| 1-2 | 9.5 | 400 | 4.0% | | |
| 2 | 9.5 | 400 | 4.0% | 5.333 g | 74.6 |
| 3 | 15.0 | 521 | 5.8% | 7.456 g | 75.5 |
| 4 | 15.0 | 521 | 5.8% | 7.307 g | 76.4 |
| 5 | 21.8 | 877 | 4.0% | 7.182 g | 74.7 |
| 6 | 21.6 | 936 | 3.9% | 7.353 g | 76.6 |

Bullet fragments of 22 caliber projectile (Type 2) meeting the specifications of Military Specification MIL-P-46593A (ORD) were shot at each of the composites at an approximate velocity of 347 m/sec using the geometry of:

| G | A | B | T | C | D |
|---|---|---|---|---|---|
| 5 feet | 3 feet | 3 feet | 1.5 feet | 3 feet | |
| 1.52 m | 0.91 m | 0.91 m | 0.46 m | 0.91 m | | where G represents the end of the gun barrel; A, B, C and D represent four lumiline screens and T represents the center of the target plaque. Velocities before and after impact were computed from flight times A–B and C-D. In all cases, the point of penetration through screen C indicated no deviation in flight path. The difference in these kinetic energies of the fragment before and after penetration of the composite was then divided by the following areal densities of fibers to calculate an energy loss in $J(kg/m^2)$:

| Example | Fibral Areal Density (kg/m$^2$) |
|---|---|
| 1 | 1.28 |
| 2 | 0.92 |
| 3 | 1.28 |
| 4 | 1.26 |
| 5 | 1.24 |
| 6 | 1.27 |

TABLE 3

| Ex. | Run | Tenacity (g/denier) | Velocity (m/sec) before/after | Kinetic Energy (J) before after | Loss [J/(kg/m$^2$)] |
|---|---|---|---|---|---|
| 1 | A | 12.0 | 337.7/282.2 | 62.8–42.9 | 14.8 |
| 1 | B | 12.0 | 346.3/298.7 | 66.0–49.1 | 13.2 |
| 2 | A | 9.5 | 346.9/317.0 | 66.3–55.3 | 11.9 |
| 2 | B | 9.5 | 335.0/304.8 | 61.8–51.2 | 11.6 |
| 3 | A | 15.0 | 386.2/287.1 | 82.1–45.4* | 28.7 |
| 3 | B | 15.0 | 335.0/277.4 | 61.8–42.4 | 15.2 |
| 4 | A | 15.0 | 333.1/274.9 | 61.1–41.6 | 15.5 |
| 4 | B | 15.0 | 335.3/277.7 | 61.9–42.5 | 15.4 |
| 5 | A | 21.8 | 353.0/287.1 | 68.6–45.4 | 18.7 |
| 5 | B | 21.8 | 343.2/277.1 | 64.9–42.3 | 18.2 |
| 6 | A | 21.6 | 343.8/247.8 | 65.1–33.8 | 24.6 |
| 6 | B | 21.6 | 337.4/249.0 | 62.7–34.2 | 22.5 |

*Note the unusually high initial velocity for Example 3, Run A.

Plotting the energy loss versus fiber tenacity shows a positive correlation, with the relationship being fairly linear, except for low values for both composites of Example 5 (which may have experienced fiber melting during molding).

EXAMPLE 7

The procedure of Examples 1–6 was repeated using a 26.5 g/denier fiber, except that only a single pair of composites was prepared. Then the two composites were molded together using a film of low density polyethylene between them. This composite had 68% fibers and a fiber areal density of 1.31 kg/m$^2$. On firing, the velocities before and after impact were 1143 ft/sec and 749 ft/sec (348.4 and 228.3 m/sec). The kinetic energies before and after impact were 66.9 J and 28.7 J. The energy loss based on 1.31 kg/m$^2$ fiber areal density was then 29.1 J/(kg/m$^2$), which, when plotted, falls on the line drawn through points from Examples 1–4 and 6.

COMPARATIVE EXAMPLE 8

Composites were prepared as in Examples 1–6 using a melt-spun polyethylene fiber having a tenacity of 5.6 g/denier. Some fiber melting occurred during molding due to the close melting points of the melt spun fiber and the high density polyethylene fiber. On firing a projectile the velocities measured before and after impact were 342.3 and 320.3 m/sec (1,123 ft/sec and 1051 ft/sec), for energies before and after of 64.51J and 56.5 J. The energy loss, based on a fibral areal density of 1.31 kg/m$^2$ is 6.35 J/(kg/m$^2$). substantially lower than the values for Examples 3–6 (being within the scope of the present invention), and lower even than values for Examples 1 and 2, where the fiber tenacity was under 15 g/denier.

EXAMPLES 9 AND 10 AND COMPARATIVE EXAMPLE 11

EXAMPLE 9

A high tenacity polyethylene fiber (tenacity 18.4 g/denier, tensile modulus 673 g/denier) was coated with low density polyethylene from a toluene solution. The polyethylene (tradename Union Carbide PE-DPA 6169 NT) had a melt index of 6 and a density of 0.931 g/cm$^3$. The coated fibers were wound on a three inch by three inch (6.75 cm × 6.75 cm) steel plate, with each layer wound perpendicular to the previous layer. The wound plate was molded for 30 minutes at 120°–130° C. The composite was then cut around the edges and the two halves molded together with a thin film of low density polyethylene in the center to obtain a single plaque having 86.6 weight % fiber content. Ballistics testing of this plaque is described below.

EXAMPLE 10

Example 9 was repeated using a high tenacity polyethylene fiber (tenacity 19.0 g/denier, modulus 732 g/denier) coated with high density polyethylene (tradename EA-55-100, melt index=10, density 0.955 g/cm$^3$). After molding for 30 minutes at 130°–140° C., two composite plaques were produced (10A and 10B) each with 72.6 weight % fiber contact. Ballistic testing is described below.

COMPARATIVE EXAMPLE 11

For comparison, a 1500 denier KEVLAR ® 29 aramid yarn (22 g/denier) woven roving fabric prepregged with phenolic polyvinyl butyral resin (resin content 20 weight %) was molded for 20 minutes at 166° C. Three such plaques (11A, 11B and 11C) were prepared with a fiber areal density of 1.04 kg/m$^2$ each.

BALLISTIC TESTING 9–11

The six composites of Examples 9 and 10 and of Comparative Example 11 were taped over a 2.2 inch by 2.1 inch (5.6 cm × 5.6 cm) cut in a three-eighths inch (1 cm) plywood sheet. Bullet fragments (0.22 type 2) according to Military Specification MIL-P-46593A (ORD) were fired through the plaques using the geometry of:

| G | A | B | T | C | D |
|---|---|---|---|---|---|
| 5 feet | 3 feet | 3 feet | 1.5 feet | 3 feet | |
| 1.52 m | 0.91 m | 0.91 m | 0.46 m | 0.91 m | | where G represents the end of the gun barrel; A, B, C and D represent four lumiline screens and T represents the center of the target plaque. Velocities before and after impact were computed from flight times A–B and C–D. In all cases, the point of penetration through screen C indicated no deviation in flight path. The results are displayed in Table 4.

TABLE 4

| Composite | Areal Density kg/m$^2$ | Velocity (m/sec) Before | After | KE(J) Before | After | Energy Loss [J/(kg/m$^2$)] |
|---|---|---|---|---|---|---|
| 9 | 1.11 | 327.7 | 226.2 | 59.1 | 28.2 | 27.9 |

TABLE 4-continued

| Composite | Areal Density kg/m² | Velocity (m/sec) Before | Velocity (m/sec) After | KE(J) Before | KE(J) After | Energy Loss [J(kg/m²)] |
|---|---|---|---|---|---|---|
| 10A | 0.797 | 335.6 | 283.5 | 62.0 | 44.3 | 22.3 |
| 10B | 0.797 | 331.3 | 278.3 | 60.5 | 42.7 | 22.3 |
| 11A | 1.04 | 300.5 | 205.7 | 49.8 | 23.3 | 25.4 |
| 11B | 1.04 | 342.6 | 273.4 | 64.7 | 41.2 | 22.6 |
| 11C | 1.04 | 338.0 | 257.9 | 62.9 | 36.6 | 25.3 |
| controls | | 336.2 | 324.9 | 62.3 | 58.2 | — |
| (no composites) | | 337.7 | 327.4 | 62.8 | 59.0 | — |

These results indicate comparable performance for composites prepared from polyethylene fibers of 18.4–19.0 g/denier tenacity and composites prepared from aramid fibers of 22 g/denier. Since the process of Kavesh et al. can produce fibers of tenacity 30 g/denier, 40 g/denier or higher, it is expected that these fibers would substantially outperform aramid fibers for ballistic applications.

EXAMPLES 12–13

Four 16 filament polyethylene xerogels were prepared according to the procedure described above before Example 1, but with 16 spinnerettes. One of the yarns (having been prepared from a 22.6 IV polymer) was stretched using one end at 140° C. (18:1); the other three yarns were stretched together (48 filaments) at 140° C. (17:1). The properties of these two yarns were measured and are displayed in Table 5 with published data on KEVLAR ®-29 aramid yarn.

TABLE 5

| | 16 Fil | 48 Fil | KEVLAR-29 |
|---|---|---|---|
| Denier | 201 | 790 | 1043 |
| Tenacity (g/den) | 21 | 18 | 22 |
| Modulus (g/den) | 780 | 650 | 480 |
| Elongation | 3.9% | 4.7% | 3–4% |

An aluminum plate; three inches×three inches×four-tenths inch (7.6 cm×7.6 cm×1 cm) was wound with one yarn, then covered with a 1.4 mil (0.036 mm) thick high density polyethylene film (Allied Corporation's 060-003), then wound in a perpendicular direction with yarn, then coated with film. After 10 fiber layers and 10 film layers were present on each side of the plate, the covered plate was cured at 136.6° C. for 15 minutes at 400 psi (2.76 MPa) pressure.

After molding, the composite ensemble was split around its edges to remove the aluminum plate. One of the 10 layer composites was retained for ballistic testing and the other was used as a central core for winding an additional 6 yarn/film layers to prepare a composite containing a total of 22 yarn layers (both 16 fil yarn and 48 fil yarn were used). The areal densities and the fiber areal densities of the 10 layer and 22 layer ECPE composites are given in Table 2, below. The fiber volume fraction was about 75% in each.

Ballistics testing of these composites are described below.

EXAMPLE 14

A fourteen layer composite similar to the twenty-two layer composite of Example 13 was prepared by winding two fiber/film layers onto each side of a similar ten layer composite. The fourteen layer composite had a total areal density of 0.274 kg/m³ and fibral areal density of 0.167 kg/m³. The same 16 and 48 fiber yarn was used.

COMPARATIVE EXAMPLE 15

Composites of Kevlar-29 aramid and polyester resin were prepared in a similar manner except that the matrix polyester system was doctored onto each Kevlar layer to impregnate the ensemble. The polyester system was Vestopal-W plus 1% tertiary butyl perbenzoate and 0.5% cobalt napthenate. The ensembles were cured at 100°±5° C., for one hour at approximately 400 PSI (2.76 MPa) pressure. The areal densities and fiber areal densities are given in Table II. The fiber volume fractions were 75%.

Ballistic Testing

Ballistic testing of the composites of Examples 12–14 and the Kevlar-29/polyester 3"×3" composite plaques of comparative Example 15 were performed in an identical manner. The plaques were placed against a backing material consisting of a polyethylene covered water-filled urethane foam block. The density of the backing material was 0.93 g/cm³. The ammunition fired was 22 caliber, longrifle, high velocity, solid nose, lead bullets. The rounds were fired from a handgun of six inch (15 cm) barrel length at a distance of six feet (1.8 m), impacting perpendicular to the plaque surface. Impact velocity was approximately 1150 ft/sec (353 m/sec) (Ref: "Gunners Bible", Doubleday and Co., Garden City, N.Y. 1965).

The qualitative results are displayed in Table 6. In the column labeled "Penetration" the word "Yes" means that the bullet passed completely through the plaque; the word "No" means that the bullet was stopped within the plaque.

TABLE 6

| Example | Layers | Composite Areal Density (g/cm³) | Fiber Areal Density (g/cm³) | Penetration |
|---|---|---|---|---|
| 12 | 10 | 0.122 | 0.097 | Yes |
| 13 | 22 | 0.367 | 0.248 | No |
| 14 | 14 | 0.274 | 0.167 | No |
| 15A | 7 | 0.131 | 0.097 | Yes |
| 15B | 12 | 0.225 | 0.167 | No |
| 15C | 18 | 0.360 | 0.256 | No |

These results indicate that the composites using polyethylene fibers of 18–21 g/denier tenacity required roughly the same areal density (0.167±0.05 g/cm³) as the aramid composite to defeat the 22 caliber projectile.

EXAMPLE 16—MODE OF FAILURE

The fragment exit side of Example 7 was examined by scanning electron microscopy and found to have a fibrillar structure similar to that reported for Kevlar ® fibers (Ballistic Materials and Penetration Mechanics—R. C. Laible—Elsevier Scientific Publishing Company—1980). Fibers exhibited extensive longitudinal splitting similar to that found when fibers were broken in an Instron Tensile Tester using a 10 inch (25.4 cm) length of fiber pulled at 10 in./min (25.4 cm/min). There was no evidence of the smooth knobs shown at the end of impacted polyester fibers shown in FIG. 6, Page 84—Ballistic Materials and Penetration Mechanics. (The knob-like structure at the end of the impacted polyester is attributed to melting).

Example 2B (see Table 3) exhibited similar morphology after ballistic impact, but the fibrillation was less extensive, and there was evidence of a minor amount of melting.

EXAMPLE 17—ADDITIONAL POLYETHYLENE MATRIX COMPOSITES EVALUATED AGAINST FRAGMENTS

A series of composites were prepared in a fashion similar to the earlier examples using fibers of higher tensity and modulus (in the 25–35 g/den tenacity range). Each composite was fired at with fragments having a velocity of about 1,090–1,160 feet/second (332–354 m/sec) or 2,000–2,055 feet/second (610–627 m/sec.). From the measured velocity of fragments before and after passing through the composites, an energy loss (per unit of fiber areal density) was calculated in $Jm^2/kg$. The results are displayed in Table 7:

TABLE 7

| Composite | Fiber Ten | Fiber Mod | Fiber Aereal Density | Energy Absorption low vol. | Energy Absorption high vol. |
|---|---|---|---|---|---|
| HDPE MATRIX | | | | | |
| 20 | 33.2 | 2020 | 1.24 | >42 | — |
| 21A | 32.2 | 1904 | 0.89 | 27 | — |
| 21B | " | " | " | 38 | — |
| 34-1A | 27.8 | 1290 | 0.75 | 28 | — |
| 34-1B | " | " | " | 35 | — |
| 34-2A | 29 | 1235 | 0.80 | 20 | — |
| 34-2B | 29 | " | " | 24 | — |
| LDPE MATRIX | | | | | |
| 22 | 27.5 | 1193 | 0.96 | 40, >57* | — |
| 23 | 27.0 | 1270 | 0.87 | 27, 26* | — |
| 24 | 25.2 | 1210 | 0.90 | 30, 42* | — |
| 25 | 26.0 | 1265 | 0.91 | 27, 32* | — |
| 26 | 25.0 | 1176 | 0.59 | 28, 27* | — |
| 27 | 33 | 1720 | 0.91 | 57 | 34 |
| 28 | 30 | 1835 | 0.91 | — | 32 |
| 29 | 29 | 1487 | 0.99 | — | 49 |

*two identical composites molded together and each fired at with low velocity fragments giving different energy absorption values.

EXAMPLE 18—ADDITIONAL COMPOSITES TESTED AGAINST LEAD BULLETS

A series of four composites with HDPE matrixes were prepared in a manner similar to the earlier examples and fired at by 22 caliber solid lead bullets using the geometrical arrangement of Examples 1–6 and 9–11. The results (with initial velocities of 1,130–1,170 feet/second (344–357 m/sec)) were as shown in Table 8.

TABLE 8

| Composite | Fiber Ten | Fiber Mod | Fiber Aerial Density | Weight % Fiber | Energy Absorption | Comments |
|---|---|---|---|---|---|---|
| 30-2 | 15.7 | 378 | 1.24 | 79 | 37, 44* | |
| 30-1 | 24.0 | 760 | 1.00 | 80 | 39, 32* | |
| 30-3 | 25.5 | 969 | 1.26 | 77 | 123 | stopped bullet |
| 30-4 | 30.5 | 1618 | 1.00 | 71 | 154, 164 | captured & stopped |

TABLE 8-continued

| Composite | Fiber Ten | Fiber Mod | Fiber Aerial Density | Weight % Fiber | Energy Absorption | Comments |
|---|---|---|---|---|---|---|
| | | | | | | bullet |

The composite shown as "20" in Table 7 (using a 33.2 g/den tenacity, 2,020 g/den modulus fiber) also captured the bullet and, thus, had an energy absorption of 129 $Jm^2/kg$. By "captured" is meant that the bullet and composite came out of the frame (together) and continued at low velocity down range. By "stopped" is meant that the bullet remained in the composite on the frame.

EXAMPLE 20—COMPOSITES WITH THERMOSETTING MATRIX

A series of composites were prepared using a modified polyethylene fiber (having 3% of an ethyleneacrylic acid copolymer with 5.5% acrylic acid sold by Dow Chemical as EAA-455) prepared as described for Example 3 in U.S. Ser. No. 430,577, referenced above. The fiber was molded in a Duro-Woodhill unsaturated polyester resin sold by Woodhill Permatex as an alkyd dissolved in styrene monomer. The composites were then tested against standard velocity fragments and bullets and high velocity fragments, as described previously. The results are summarized in Table 9.

TABLE 9

| Projectile | Velocity (m/sec) | Energy Absorption |
|---|---|---|
| Fragment | 343 | 32 |
| Bullet | 350 | 75 |
| Fragment | 637 | 46 |

Similar composites were prepared using KEVLAR ® 29 (tenacity 22 g/den, modulus 480 g/den) and KEVLAR ® 49 (tenacity 28 g/den, modulus 1,000 g/den) aramids. The energy absorption values were 20, 36 and 40–43$^2$ $Jm/kg$ for KEVLAR ® 29 composites and 12, 11 and 27–30 $Jm^2/kg$ for KEVLAR ® 49 composites (each for the standard velocity fragments, bullets and high velocity fragments). This limited data suggests that the present composites were better or much better than the composites made from KEVLAR ® 29 fiber. A commercial composite containing KEVLAR ® 29 aramid) tested against standard velocity fragments gave values of 23–26 $Jm/kg$.

EXAMPLES 22–25 FABRICS EVALUATED FOR BALLISTIC RESISTANCE

The fibers used in the following Examples were prepared in accordance with the procedures of Ser. Nos. 359,019 and 359,020 and had the following properties:

TABLE 10

| FIBER | DENIER | FILAMENTS | TENACITY | MODULUS |
|---|---|---|---|---|
| A | 887 | 96 | 27 | 1098 |
| B | 769 | 144 | 29.6 | 1343 |
| C | 870 | 48 | 14.8 | 516 |
| D | 887 | 96 | 27 | 1096 |
| E | 769 | 144 | 29.6 | 1343 |
| F | 647 | 128 | 32.1 | 1409 |
| G | 610 | 96 | 33.3 | 1403 |
| H | 588 | 123 | 32 | 1443 |
| I | 319 | 48 | 27 | 1662 |
| J | 380 | 96 | 28.1 | 1386 |
| K | 553 | 96 | 27.5 | 1270 |

TABLE 10-continued

| FIBER | DENIER | FILAMENTS | TENACITY | MODULUS |
|---|---|---|---|---|
| L | 385 | 64 | 30 | 1624 |
| M | 434 | 64 | 29 | 1507 |
| N | 451 | 96 | 29 | 1636 |
| O | 449 | 96 | 33 | 1502 |
| P | 403 | 64 | 30 | 1419 |
| Q | 508 | 48 | 30 | 1330 |
| R | 624 | 96 | 31 | 1300 |
| S | 274 | 32 | 32 | 1370 |

Fibers A and B were both prepared from 21.5 dL/g IV polyethylene at concentrations of 8% and 6%, respectively, in paraffin oil. Both were spun at 220° C. through 16 hole die (0.030 inches or 0.762 mm diameter) at rates of 2 and 1 cm³/min, respectively, and take-up speeds of 4.98 and 3.4, respectively. Fiber A was stretched 2:1 in-line at room temperature, 5.3:1 at 120° C. and 2.0:1 at 150° C. using feed speeds of 4.98, 1.0 and 2.0 m/min for the three stages. Fiber B was stretched 10:1 at 120° C. and 2.7:1 at 150° C. using feed speeds of 0.35 and 1.0 m/min, respectively. Fibers A and B were extracted with trichlorotrifluoroethane after stretching to remove residual paraffin oil, and then dried. Fiber C was spun at 220° C. from a 6-7% solution of a 17.5 dL/g IV polyethylene through a 16-hole die with 0.040 inch (1.016 mm) diameter holes, at a spin rate of 2.86 cm³/min and a take up of 4.1–4.9 m/min. The fiber was stretched after extraction and drying as a 48 filament bundle 15:1 at 140° C. with a 0.25 m/min feed speed.

Fibers D through S were spun in a manner similar to fibers A and B and to Examples 503–576 (and especially 534–542) of U.S. Ser. No. 359,020. Stretching conditions were as shown in Table 11. Fibers D and E are duplicates of A and B.

TABLE 11

| Fiber | Stretch Ratios | | |
|---|---|---|---|
| | Room Temperature | 120 C. | 150 C. |
| D | 2.0 | 5.25 | 2.0 |
| E | — | 10 | 2.7 |
| F | — | 10.3 | 2.5 |
| G | — | 10 | 2.5 |
| H | — | 10.3 | 2.75 |
| I | — | 6.4 | 2.85 |
| J | — | 11 | 2.5 |
| K | — | 9 | 2.5 |
| L | 2.0 | 6.45 | 2.25 |
| M | 2.0 | 6.45 | 2.25 |
| N | — | 12.5 | 2.5 |
| O | — | 10.3 | 2.75 |
| P | 2.5 | 6.5 | 1.75 |
| Q | 4.0 | 6.0 | 2.0 |
| R | 2.0 | 6.7 | 1.9 |
| S | 2.0 | 5.5 | 2.25 |

EXAMPLE 22

A fabric woven using a Leclerc Dorothy craft loom having 12 warp ends per inch (4.7 ends/cm). The warp yarn (Fiber A in Table 6) was twisted to have approximately 1 twist per inch (0.4 twists/cm). Fill yarn (Fiber B in Table 6) had the same amount of twist. Panels (8" by 4") (20.3 cm by 10.2 cm) of the fabric were cut out using a sharp wood-burning tool. (This technique yields sharp edges which do not tend to unravel.) Certain of the panels were clamped between metal picture frames and placed in an air circulation oven at the desired temperature for 10 minutes. This procedure caused the fabric to become tight in the frame. One inch (2.25 cm) strips were cut from these fabrics in the fill direction and subsequently pulled on an Instron machine using a 4 inch (9 cm) gauze length at a cross head speed of 2 inches/min (4.5 cm/min). From comparison of the initial force-displacement for fabric before and after heat-setting, it was found that heat setting improved the apparent modulus of the fabric, as shown below:

| Heat Set Temperature (°C.) | Relative Apparent Modulus |
|---|---|
| None | 1.0 |
| 135 | 1.23 |
| 139 | 1.15 |

When the force reached 500 pounds (227 kg), the fabric began to slip from the grips.

EXAMPLE 23

Fiber C (see Table 10) was woven on a Peacock 12 inch (30.5 cm) craft loom. Fabric was prepared having 8 warp yarns/in (3.15 warp yarns/cm) and approximately 45 yarns/in (17.7 yarns/cm) in the fill direction.

A rectangular piece of fabric 8.5 cm in length in the fill direction and 9.0 cm in length in the warp direction was placed in an air oven at 135° C. for five minutes. The fabric contracted 3.5% in the fill direction and by 2.2% in the warp direction. This fabric became noticeably more stable to deformation force applied at a 45° angle to the warp and fill direction.

The fabric was easily cut by applying a hot sharp edged wood burning implement to the fabric to give sharp, non-fraying edges. Attempts to cut the fabric with conventional techniques produced uneven edges which were easily frayed.

A circular piece of this untreated woven fabric, 7.5 cm in diameter, was exposed to 138° C. in an air oven for 30 minutes. Dimensions were reduced by 15% in the warp direction and by 39% in the fill direction.

EXAMPLE 24

A number of other fabrics have been prepared using a Leclarc Dorothy craft loom.

Fabric 1

All yarns were twisted on a spinning wheel and had approximately 1 turn per inch (0.4 turns/cm). Fabric was prepared 8½" (21.6 cm) wide by 16" (406 cm) long using 12 warp ends per inch (4.2 ends/cm) of yarn D. In the fill direction 12" (30 cm) of yarn E was used and 4 inches (10 cm) of yarn F. to give a fabric having an areal density of 0.297 kg/m².

Fabric 2

All yarns were twisted on a spinning wheel and had approximately 1 turn per inch (0.4 turns/cm). Fabric was prepared 8½" (21.6 cm) wide by 16" (40.6 cm) long using 12 warp ends per inch (4.7 end/cm) of yarn D. Yarn F was used for 5" (12.7 cm)) of the fill yarn. Yarn G was used for 3½" (8.9 cm) inches in the fill direction.

Fabric 3

In order to obtain yarn having denier in the range of 800-900 it was necessary to combine two different yarns to produce a single twisted yarn. The combined twisted yarn was prepared by feeding the two different non-twisted yarns simultaneously to a spinning wheel and producing a twist of approximately 1 turn per inch (0.4 turns/cm) in combined yarns. The twisted yarn was much easier to weave than the untwisted precursors. A continuous fabric 8.5 inches wide (21.6 cm) and 52 inches (132 cm) long was woven, using a plain weave and weighed 78 g, corresponding to areal density of 0.27 kg/m² (8 oz/square yard). Fabric was woven on a Leclerc Dorothy craft loom using 12 warp ends per inch 94.7 ends/cm) and approximately 56 yarns/in (12 yarns/cm) in the fill direction.

The warp ends for 6 inches (15.2 cm) of warp consisted of the combined yarn formed from yarn H and I, and for 3 inches (7.6 cm) of warp from yarns J and K. The fabric pulled in on weaving to an overall width of 8½" (21.6 cm). Fill yarns were as follows: The first 11½" (29 cm) used combined yarn from yarns J and K. The next 30½" (77.5 cm) were prepared using combined yarn N and O.

Fabric 4

In order to obtain yarn having denier of approximately 900 it was necessary to combine two different yarns to produce a single twisted yarn. The combined twisted yarn was prepared by feeding the two different non-twisted yarns simultaneously to a spinning wheel and producing a twist of approximately 0.416 turns/inch (0.16 turns/cm) in the combined yarn. A continuous fabric 9.0 inches wide (22.9 cm) and 44½ inches (113 cm) long was woven having an areal density of approximately 0.22 kg/m². Fabric was woven on a Leclare Dorothy craft loom using 24 warp ends/in (9.5 warp ends/cm) and having approximately 24 fill ends per inch (9.5 fill ends/cm).

The warp ends for 6 inches (15.2 cm) of the warp consisted of the combined yarn P and Q, and for 3 inches (7.6 cm) consisted of the yarn formed by combining yarns R & S. The entire fill yarn consisted of the yarn prepared by combining yarns R and S.

Fabric 5

This commercial Kevlar® 29 ballistic fabric was obtained from Clark-Schwebb Fiber Glass Corp. (Style 713, Finish CS-800) and contained 32 ends/in of untwisted yarn in both the warp and fill directions. The areal density of this yarn was 0.286 kg/cm³.

EXAMPLE 25—BALLISTIC EVALUATION OF FABRICS

Fabrics were held in an aluminum holder consisting of 4 in square (10 cm) aluminum block, ½ in (1.2 cm) thick having a 3 in (7.6 cm) diameter circle in the center. At the center of one side a 0.5 cm diameter hole was drilled and connected the large circle via a slit, and on the opposite side of the circle a 0.5 cm slit was cut to the edge of the square. A screw arrangement allowed the slit to be closed down. Fabric was stretched over appropriate size aluminum rings and the square holder tightened around the fabric. Projectiles were fired normal to the fabric surface and their velocity was measured before impact and after penetration of the fabric. Two types of projectiles were used:

(1) 22 caliber fragments—weight 17 gms (1.1 grams), Military Specification MIL-P-46593A (ORD) Projectile Calibers .22, .30, .50 and 20 mm Fragment Simulating.

(2) 22 Caliber solid lead bullets—weight 40 grains (2.5 gms)

Fabric was cut into 4 in by 4 in squares (10.2 cm squares). The individual squares were weighed and the areal density was calculated. The desired number of layers were placed in the holder for ballistic testing.

Certain of the fabric squares were heat set at 138° C. between two picture frames 4 ins (10.2 cm) square outside dimension and a 3 in (7.6 cm) inside dimension.

Pressure was applied using C-clamps on the picture frame. The average value for energy absorption using two layers of Kevlar 29 was 35.5 J.m²/kg, which was lower than that obtained for all of the polyethylene fabrics tested. The average value for energy absorption using 2 layers of Fabric 4 was 49.4 J.m²kg before heat setting and 54.7 after heat setting. The energy absorption of Fabric 3, using two layers of Fabric, was 45.5 J.m²/kg before heat setting and 49.2 J.m²kg after heat setting.

Against lead bullets the average value for energy absorption for 2 layers of Fabric 4 was 7.5 J.m²/kg before heat setting and increased to 16.6 J.m²/kg after heat setting. Similarly the average value of energy absorption increased from 5.9 to 11.0 J.m²/kg for Fabric 3. Based upon mode of failure (whole loops being pulled out), the relatively low values for all polyethylene fabrics against bullets suggest that different weaving techniques might realize the full potential of the fibers (as with fragments).

Nevertheless, all ballistic results indicate that heat setting increases the energy absorption of the polyethylene fabrics.

EXAMPLE 26

This Example illustrates some additional polyethylene fabrics that were prepared and tested against fragments and lead bullets as described previously. Such fabric was prepared generally as indicated in Examples 22-24 using various combinations of polyethylene fibers prepared by the procedures of U.S. Ser. No. 359,019 with the 100 filament yarns twisted 0.29 turns/inch (0.11 turns/cm). The fabrics (and fibers) are summarized in Table 12; the ballastic evaluation of two sheets (10.2 cm × 10.2 cm) of this fabric subjected to various treatments summarized in Table 13. In Table 13 "Vin" represents the velocity in m/sec of 0.22 fragments measured as they entered the composite, and "Areal Density" represents the fibral areal density in kg/m².

TABLE 12

| Fabric | | Yarns Employed | | | Average Areal Density As Made |
|---|---|---|---|---|---|
| | | Filaments | Denier | Ten | Mod | |
| 6* | Warp | 100 | 1086 | 31.6 | 1116 | 0.23 kg/m² |
| | Warp | 100 | 1197 | 29.7 | 1030 | |
| | Fill | 100 | 1057 | 31.5 | 1075 | |
| 7** | Warp | 100 | 1175 | 28.5 | 1188 | 0.25 kg/m² |
| | Warp | 100 | 1162 | 31.5 | 1215 | |
| | Warp | 100 | 1100 | 30.6 | 1226 | |
| | Warp | 100 | 1390 | 27.1 | 1217 | |
| | Warp | 100 | 1238 | 30.8 | 1249 | |
| | Fill | 100 | 1074 | 28.4 | 1224 | |
| | Fill | 100 | 1084 | 29.1 | 1177 | |
| | Fill | 100 | 1196 | 29.3 | 1217 | |

*The yarns of fiber 6 were twisted 0.28 turns/inch (0.11 turns/cm) and contained about 24 ends/inch (9.4 ends/cm) in both warp and fill directions.
**The yarns of fiber 7 were twisted 0.56 turns/inch (0.22 turns/cm) and then permitted to relax to a level between 0.28 and 0.56 times/inch (0.11-0.22 turns/cm). The fabric contained about 24 ends/inch (9.4 ends/cm) in both directions.

TABLE 13

| Sample | Fabric | Heat Treatment | Temperature | Areal Density | Vin | Energy Absorption (Jm²/kg) |
|---|---|---|---|---|---|---|
| 6-1 | 6 | In Frame | 145° C. | 0.452 | 350 | 39.1 |
| 6-2 | 6 | In Frame | 145° C. | 0.460 | 349 | 62.1 |
| 6-3 | 6 | In Frame | 155° C. | 0.513 | 358 | 53.9 |
| 6-4 | 6 | In Frame | 155° C. | 0.525 | 326 | 41.7 |
| 6-5 | 6 | In Frame | 130° C. | 0.472 | 340 | 50.6 |
| 6-6 | 6 | In Frame | 130° C. | 0.478 | 345 | 48.4 |
| 6-7 | 6 | W/o Frame | 140° C. | 0.447 | 333 | 32.9 |
| 6-8 | 6 | W/o Frame | 140° C. | 0.447 | 343 | 46.8 |
| 6-9 | 6 | W/o Frame | 140° C. | 0.521 | 342 | 52.3 |
| 6-10 | 6 | None | — | 0.437 | 333 | 48.1 |
| 6-11 | 6 | None | — | 0.451 | 341 | 47.5 |
| KEVLAR ® 29 | | — | — | 0.562 | 342 | 34.4 |
| KEVLAR ® 29 | | — | — | 0.562 | 336 | 40.3 |
| KEVLAR ® 29 | | — | — | 0.562 | 350 | 33.9 |

These results show some improvement on heat-setting, especially at 130°–145° C., but no loss in properties even when heat-set at 155° C. Analysis of fabrics after testing showed loops pulled out, suggesting that better weaving techniques would still further improve these results.

EXAMPLE 27

This Example illustrates fabrics molded into film-like structures (by the procedures claimed in Ser. No. 467,997, filed Feb. 18, 1983).

The two-ply samples of fabric 6 (see Table 12) were molded at a pressure of 24.1 MPa and temperature of 140° C. for 5 minutes in a mold, keeping the ends taut in a frame. These samples (areal densities 0.478 and 0.472 kg/m²) were tested in like manner to the heat-set fabric samples (see Table 13 for comparison) and, with initial 22 caliber fragment velocities of 1,145 and 1,118 feet/second (349 and 341 m/sec) showed energy absorption values of 62.9 and 54.7 Jm²/kg, respectively.

Similar molded fabrics appeared generally equivalent to KEVLAR ® 29 fabrics in the areal density required to stop penetration by 0.13 gram fragments with initial velocities about 2,200 ft/sec (671 m/sec).

EXAMPLE 28

Six plaques were then prepared from fibers only (using a 100 filament, 1,384 denier twisted yarn of 27.3 g/den tenacity and 963 g/den modulus) by winding successive layers at right angles around a 3 inch by 3 inch (6.7 cm×6.7 cm) aluminum plate. Molding three wound plates at 5, 15 and 30 tons (4.3, 12.9 and 25.8 MPa) pressure produced six plaques, each having an areal density of about 1 kg/m². Firing 22 caliber fragments at these plaques produced the results shown in Table 14.

TABLE 14

| Pressure (Mpa) | Areal Density (kg/m²) | Velocity In (m/sec) | Energy Absorption Jm²/kg |
|---|---|---|---|
| 4.3 | 1.133 | 346 | 30.8 |
| 4.3 | 1.133 | 344 | 31.8 |
| 12.9 | 1.093 | 349 | 38.5 |
| 12.9 | 1.093 | 348 | 39.7 |
| 25.8 | 1.005 | 350 | 36.4 |
| 25.8 | 1.005 | 356 | 32.1 |

This procedure was repeated using various 16 and 64 filament (116–181 and 361–429 denier, respectively) yarns of 29–31 g/den tenacity, 1,511–1,590 g/den modulus and also using, in some cases, various amounts of HDPE film as a matrix. Energy absorption (based on fiber content) was 33–43 Jm²/kg in all instances and appeared generally independent of fiber/matrix ratio. This suggests that molded articles with fiber only could have the highest energy absorption on a total weight basis.

We claim:

1. A ballistic-resistant article of manufacture comprising a flexible network of polyolefin fibers having, in the case of polyethylene fibers, a weight average molecular weight of at least about 500,000, a tensile modulus of at least about 300 g/denier and a tenacity of at least about 15 g/denier, and in the case of polypropylene fibers, a weight average molecular weight of at least about 750,000, a tensile modulus of at least about 160 g/denier and a tenacity of at least about 8 g/denier, said fibers being formed into a network of sufficient thickness to absorb the energy of a projectile.

2. The ballistic-resistant article of claim 1 wherein said polyethylene fibers have a tenacity of at least about 25 g/denier.

3. The ballistic-resistant article of claim 2 wherein said polyethylene fibers have a tenacity of at least about 30 g/denier.

4. The ballistic-resistant article of claim 2 wherein said polyethylene fibers have a tensile modulus of at least about 1,000 g/denier.

5. The ballistic-resistant articles of claim 2 wherein said polyethylene fibers have a tensile modulus of at least about 1,500 g/denier.

6. The ballistic-resistant article of claim 1 comprising a fabric.

7. The ballistic-resistant article of claim 6 wherein said fabric has been heat set.

8. The ballistic-resistant article of claim 6 wherein said fabric has been subjected to heat and pressure.

9. The ballistic-resistant article of claim 1 wherein said ballistic-resistant article is a flexible network of said polyethylene fibers that has been subjected to heat and pressure.

10. The ballistic-resistant article of claim 1 consisting essentially of a flexible network of said polyolefin fibers that has been subjected to heat and pressure.

11. The ballistic-resistant article of claim 1 comprising a fabric.

12. The ballistic-resistant article of claim 11 wherein said fabric has been subjected to heat and pressure.

13. The ballistic-resistant article of claim 1 wherein said ballistic-resistant article is a flexible network of said polyethylene fibers that has been subjected to heat and pressure.

14. The ballistic-resistant article claim 13 wherein said polyethylene fibers have a tenacity of at least about 15 g/denier.

15. The ballistic-resistant article of claim 14 wherein said polyethylene fibers have tenacity of at least about 30 g/denier.

16. The ballistic-resistant article of claim 14 wherein said polyethylene fibers have a tensile modulus of at least about 1,000 g/denier.

* * * * *

UNITED STATES PATENT AND TRADEMARK OFFICE
CERTIFICATE OF CORRECTION

PATENT NO. : 4,457,985
DATED : July 3, 1984
INVENTOR(S) : G. A. Harpell, et al.

It is certified that error appears in the above-identified patent and that said Letters Patent are hereby corrected as shown below:

Cover sheet, asterisk item:

"Sep. 6, 1990" should read --Sep. 6, 2000--

Signed and Sealed this

Nineteenth Day of February 1985

[SEAL]

Attest:

DONALD J. QUIGG

Attesting Officer

Acting Commissioner of Patents and Trademarks